Figure 1:
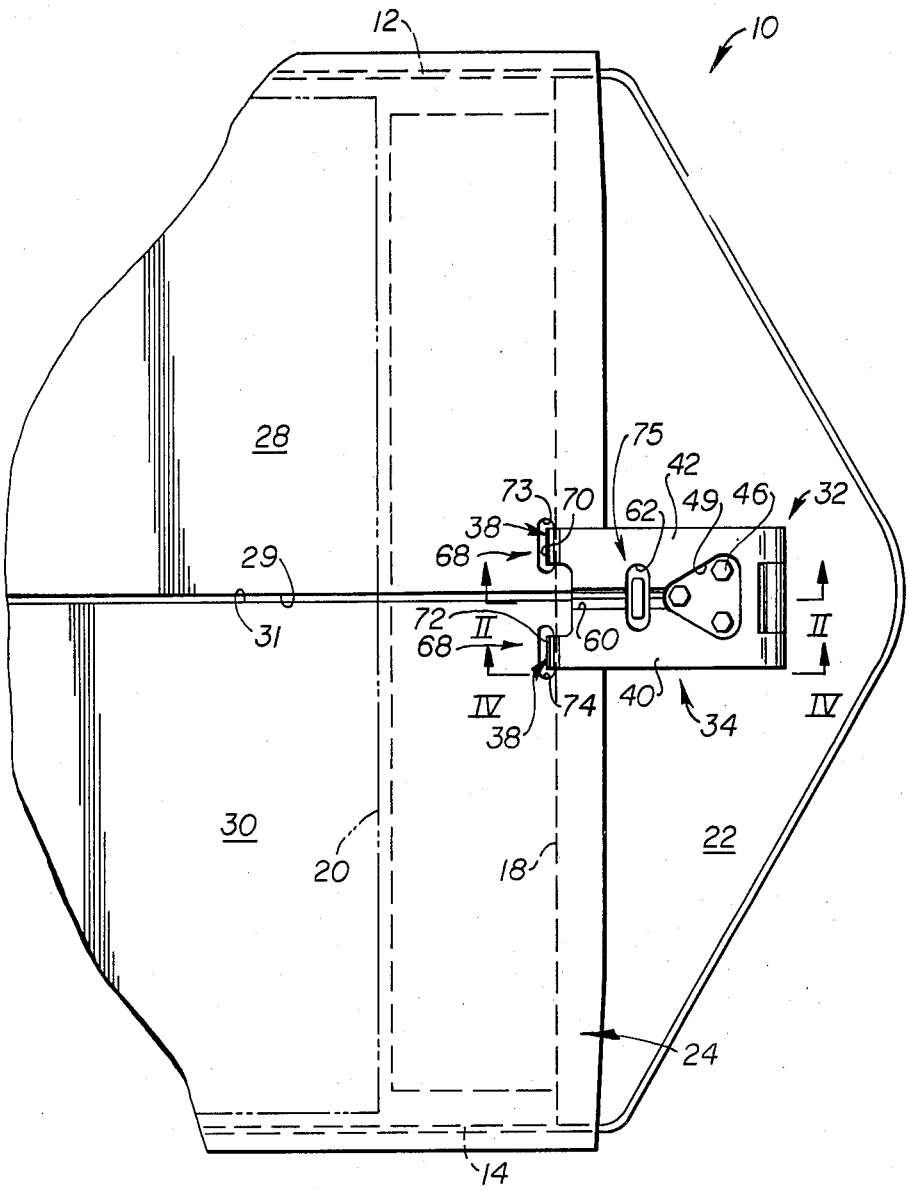
Figure 2:
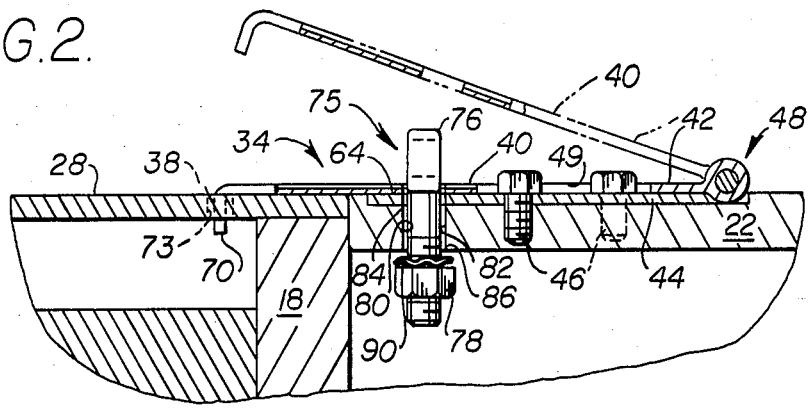
Figure 3:
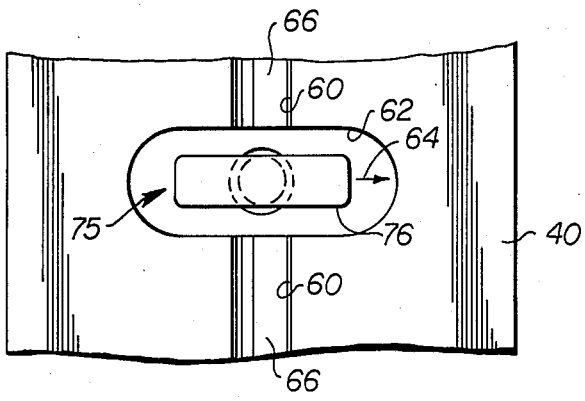
Figure 4:
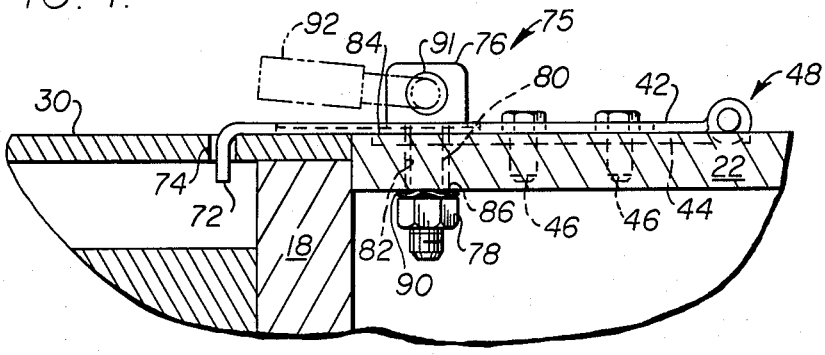

United States Defensive Publication [19] (H) [11] T100,803

Morrow [43] Jul. 7, 1981

[54] LATCH FOR BATTERY COVERS

[76] Inventor: David L. Morrow, 1148 Plainfield Rd., South Euclid, Cuyahoga County, Ohio 44121

[21] Appl. No.: 55,112

[22] Filed: Jul. 5, 1979

[51] Int. Cl.[3] ..... E05C 19/08

[52] U.S. Cl. ..... 292/285

[57] ABSTRACT

A latch assembly (32) is disclosed for use with a compartment (10) of the type having a cover structure (24) removable therefrom, and a wall end portion (22). The latch assembly (32) comprises a strap (34) with finger members (56,58) receivable into apertures (52,54) of the cover structure. The strap is pivotally connected to the wall end portion and may be raised from and lowered into the apertures. The strap has a slot (62), defining a first surface, which is transverse to a recess (60), defining a second surface. A keeper (75) is positionable into contact and out of contact with the second surface. When the keeper is positioned out of contact with the second surface, the strap may be raised and the cover structure removed; when the keeper is in contact with the second surface, the latch assembly restrains movements in all directions which would act to displace the cover structure from its covering position. The principal use of the latch assembly is for securing a pair of battery cover members (28,30) to the battery compartment (10) of an electrically driven vehicle.

5 Claims, 2 Sheets Drawing,

11 Pages Specification

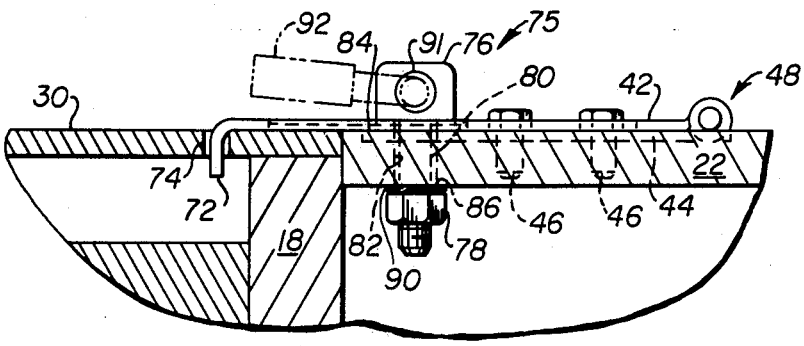

The file of this unexamined application may be inspected and copies thereof may be purchased (849 O.G. 1221, Apr. 9, 1968).